United States Patent Office 3,203,858
Patented Aug. 31, 1965

3,203,858
BIS-β-(4-ARYLPIPERAZINO)ETHYL SULFONES FOR TREATING SCHISTOSOMIASIS
Walter E. Buting, Indianapolis, Ind., assignor to Eli Lilly and Company, Indianapolis, Ind., a corporation of Indiana
No Drawing. Filed Apr. 4, 1963, Ser. No. 270,546
13 Claims. (Cl. 167—53)

This invention relates to novel sulfones useful for the treatment of schistosomiasis. More particularly, this invention relates to bis-β-(4-arylpiperazino)ethyl sulfone derivatives and to methods for the treatment of schistosomiasis therewith.

Schistosomiasis is a seriously debilitating and frequently fatal parasitic infection caused by organisms of the genus Schistosoma. The parasitic organism which causes the infection undergoes a rather complex life cycle which requires a suitable species of snail as an intermediate host. The disease is extremely widespread and is endemic wherever the required snail intermediate is found. Schistosomiasis is an extremely serious world health problem and is considered by most authorities to be as great a problem as malaria with respect to the number of victims claimed.

At present, no satisfactory method of chemotherapy exists for the mass treatment of schistosomiasis. Parenteral injection of various derivatives of antimony has been employed, but suffers from several disadvantages. The doses required approach toxic levels, with the result that frequent, and often serious, side effects accompany treatment. Furthermore, the necessity for parenteral administration imposes limitations upon the use of such compounds for mass therapy. Attempts to provide orally active drugs which do not contain antimony have met with only limited success.

It is an object of this invention to provide compounds for the treatment of schistosomiasis which do not contain antimony. A further object of the invention is to provide antischistosomal drugs free of the undesirable side effects possessed by the currently employed therapeutic agents. Still another object is to provide such drugs which are orally effective. These and other objects of the invention will be more fully understood in the light of the description which follows.

The novel compounds of this invention are represented by the formula:

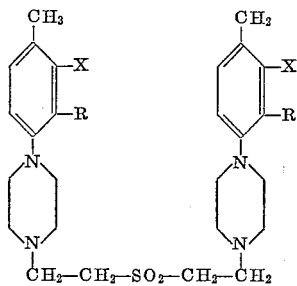

wherein X is halogen such as fluorine, chlorine, bromine, or iodine, and R is hydrogen or methyl. An especially preferred compound is that in which X is chlorine and R is hydrogen. Also a part of the present invention are the salts of the above compounds with pharmaceutically acceptable organic and inorganic acids, such as hydrochloric, hydrobromic, sulfuric, phosphoric, p-toluenesulfonic, naphthalenesulfonic, 2,4-dinitrobenzoic, naphthoic, acetic, citric, pamoic, furoic, maleic, tartaric, and like acids.

The novel bis-β-(4-arylpiperazino)ethyl sulfones of the present invention are prepared by reacting two moles of a suitably substituted N-arylpiperazine with one mole of divinyl sulfone, whereby an arylpiperazine moiety is added to each of the double bonds of the divinyl sulfone. The reaction is commonly carried out in a solvent such as benzene, toluene, methanol, ethanol, or the like. An especially preferred solvent for the reaction is ethanol. The reaction can be conducted at ambient room temperature, although higher or lower temperatures can be employed as desired. It is generally desirable, however, to heat the reaction mixture for at least a short time in order to insure completion of the reaction and particularly to insure complete utilization of the divinyl sulfone. The bis-β-(4-arylpiperazino)ethyl sulfones commonly precipitate from the reaction mixture as finely crystalline white or nearly white solids.

Exemplary of the compounds which can be prepared by this procedure and which are included within the scope of this invention are bis-β-[3-chloro-4-methylphenyl)piperazino]ethyl sulfone, bis-β-[4-(3-bromo-4-methylphenyl)piperazino]ethyl sulfone, bis-β-[4-(3-iodo-4-methylphenyl)piperazino]ethyl sulfone, bis-β-[4-(3-fluoro-4-methylphenyl)piperazino]ethyl sulfone, bis-β-[4-(3-chloro-2,4-dimethylphenyl)piperazino]ethyl sulfone, bis-β-[4-(3-bromo-2,4-dimethylphenyl)piperazino]ethyl sulfone, bis-β-[4-(3-iodo-2,4-dimethylphenyl)piperazino]ethyl sulfone, and bis-β-[4-3-fluoro-2,4-dimethylphenyl)piperazino]ethyl sulfone.

The N-arylpiperazines employed as starting materials can be prepared by any of the methods commonly employed in the art for the preparation of such compounds. One such method involves the reaction of a mixture of a suitably substituted aniline and diethanolamine, which mixture has been saturated with anhydrous hydrogen chloride gas. Heat is applied gradually until the temperature of the mixture reaches about 250° C., at which time the reaction mixture is poured onto ice and made strongly basic with sodium hydroxide, potassium, hydroxide, or the like. The oil which separates is extracted with a suitable solvent such as for example chloroform or ether, and, after evaporation of the solvent, the residual N-arylpiperazine is purified by distillation at reduced pressure.

The bis-β-(4-arylpiperazino)ethyl sulfones of this invention and the acid addition salts thereof are extremely effective agents for treating schistosomiasis in animals such as mice, monkeys, and the like. Moreover, they are effective by either oral or parenteral routes of administration. The compounds are employed for the control of schistosomiasis by administering to a parasitized host a therapeutically effective amount of the drug, usually between about 10 and about 1000 mg./kg. of host body weight per dose, preferably between about 50 and about 500 mg./kg. The compound can be administered in any of a variety of dosage forms which may include the drug alone or in combination with a pharmaceutical excipient such as a solid or liquid diluent, buffer, binder, coating material, emulsifier, or the like. The solid dosage forms are especially convenient to administer and may, in one embodiment of the invention, consist of the selected compound incorporated in a physiologically compatible excipient, for example a component or combination of components of the diet of the host. Alternatively, the excipient can be any bland, nonirritating material which will be accepted by the host but which itself is not physiologically utilizable, as for example an ion exchange resin or the like. Other solid dosage forms such as tablets and/or filled capsules comprising the antischistosomal agent and one or more of the commonly used diluents such as talc, lactose, starch, magnesium stearate, methylcellulose or the like can be employed with equally good results.

The oral activity of the compounds against the schistosomes, which are blood-borne parasites, is especially surprising in the case of the free bases in view of the very limited solubility of these compounds. Thus, for example, the especially preferred bis-$\beta$-[4-(3-chloro-4-methylphenyl)piperazino]ethyl sulfone as the free base is soluble in water only to the extent of 0.01 mg./ml. at pH 6.8, and even at pH 2.2 is soluble only to the extent of 0.18 mg./ml.

An outstanding advantage of the compounds of this invention stems from their nontoxic nature. Thus, for example, the oral $LD_0$ in mice of the preferred bis-$\beta$-[4-(3-chloro-4-methylphenyl)piperazino]ethyl sulfone is greater than 2000 mg./kg. Furthermore, rhesus monkeys which were treated orally with 400 mg./kg. of the drug daily for at least 54 days failed to show any gross indications of toxicity, and histological examinations at autopsy demonstrated normal tissues. This extraordinary lack of toxicity makes possible the use of these compounds as prophylactic as well as therapeutic agents. Thus, for example, the subject compounds can be included at low levels in the normal diet of the host species, thereby minimizing the possibility that an infection will be established following exposure to schistosome cercariae.

The general procedures employed in the preparation of the compounds of this invention and some of the methods of utilizing them in the treatment of schistosomiasis are illustrated in the examples which follow. The invention, however, is not to be construed as being limited to these methods, either preparative or therapeutic, inasmuch as other variations will be apparent to those skilled in the art.

EXAMPLE 1

(a) A mixture of 1198 g. of 3-chloro-4-methylaniline and 730 g. of diethanolamine is stirred in a five-liter flask while anhydrous hydrogen chloride is passed into the mixture. The temperature of the mixture rises gradually to about 200° C. without external application of heat. At this temperature, further admission of hydrogen chloride is discontinued, and the reaction mixture is heated gradually to about 260° C. The hot mixture is then poured onto ice and the resulting mixture is made strongly alkaline. The product is extracted with ether, dried over pellets of potassium hydroxide, and distilled at reduced pressure. The N-(3-chloro-4-methylphenyl)piperazine so obtained boils at about 130° C. at about 0.05 mm.

(b) A solution of 59 g. of divinyl sulfone in 500 ml. of absolute ethanol is added dropwise to a stirred solution of 210 g. of N-(3-chloro-4-methylphenyl)piperazine in 1000 ml. of absolute ethanol. The reaction mixture is stirred overnight at room temperature, and the reaction is completed by heating under reflux for one hour. The reaction mixture is cooled and filtered, and the bis-$\beta$-[4-(3-chloro-4-methylphenyl)piperazino]ethyl sulfone is recrystallized from a large volume of ethanol to give about 210 g. of white, blunt needles which, after being washed on the filter with ethanol, melt at about 131–133° C. Additional material can be recovered from the mother liquor.

EXAMPLE 2

By following the general procedure of Example 1(a) with 3-bromo-4-methylaniline, dimethylamine, and anhydrous hydrogen bromide, N-(3-bromo-4-methylphenyl)piperazine boiling at about 130° C. at 0.1 mm. is obtained. When this piperazine is reacted with divinyl sulfone according to the procedure of Example 1(b), the product obtained is bis - $\beta$ - [4-(3-bromo-4-methylphenyl)piperazino]ethyl sulfone.

EXAMPLE 3

When the procedure of Example 1(a) is employed with 3-fluoro-4-methylaniline, the resulting product is N-(3-fluoro-4-methylphenyl)piperazine boiling at about 110° C. at 0.1 mm. Reaction of this intermediate with divinyl sulfone as in Example 1(b) yields bis-$\beta$-[4-(3-fluoro-4-methylphenyl)piperazino]ethyl sulfone.

EXAMPLE 4

By employing the appropriate aniline in the procedure of Example 1(a) or the modification described in Example 2, the following N-arylpiperazines are obtained:

N-(3-bromo-2,4-dimethylphenyl)piperazine, B.P. about 120° C. at about 0.1 mm., from 3-bromo-2,4-dimethylaniline;

N-(3-chloro-2,4-dimethylphenyl)piperazine, B.P. about 110° C. at about 0.1 mm., from 3-chloro-2,4-dimethylaniline;

N-(3-iodo-4-methylphenyl)piperazine from 3-iodo-4-methylaniline;

N-(3-iodo-2,4-dimethylphenyl)piperazine from 3-iodo-2,4-dimethylaniline.

Reaction of the above substituted piperazines with divinyl sulfone under the conditions described in Example 1(b) yields, in each case, the corresponding bis-$\beta$-(4-arylpiperazino)ethyl sulfone.

EXAMPLE 5

The efficacy of bis-$\beta$-[4-(3-chloro-4-methylphenyl)-piperazino]ethyl sulfone given by gavage against *Schistosoma mansoni* in experimentally infected mice was determined as follows:

Mice infected with the Puerto Rican strain of *S. mansoni* were segregated in groups containing 10-14 mice per group. The mice were kept for six to seven weeks prior to treatment in order to permit the development of a mature infection. In each case, at least one group was maintained without treatment throughout the experiment to serve as a control. When the infections had matured, the mice were given bis-$\beta$-[4-(3-chloro-4-methylphenyl)-piperazino]ethyl sulfone by gavage, a method of administration in which the drug is administered by means of a stomach tube or similar device. After treatment, the mice were kept for an additional 10–18 days. They were then necropsied and the remaining worms were counted. The results are presented in Table I.

Table I.—*Efficacy of bis - $\beta$ - [4-(3 - chloro - 4 - methylphenyl)piperazino]ethyl sulfone against S. mansoni in mice*

| Daily Dose, mg./kg. | No. of Doses | No. of Mice | Worm Reduction,[a] percent |
|---|---|---|---|
| 200 | 1 | 12 | 65 |
| 200 | 4 | 11 | 96 |
| 200 | 10 | 14 | 96 |
| 50 | 4 | 11 | 62 |
| 50 | 10 | 11 | 52 |
| 50 | 10 | 12 | 75 |

[a] $\dfrac{\text{Avg. number worms/control animal} - \text{avg. number worms/treated animal}}{\text{avg. number worms/control animal}} \times 100\%$

EXAMPLE 6

This experiment, in general, was conducted as described in Example 5, except that the drug was administered as a component of the diet during the two-week treatment period. The results are shown in the following table:

Table II.—Efficacy of bis-β-[4-(3-chloro-4-methylphenyl)piperazino]ethyl sulfone against S. mansoni in mice

| Level of Drug in Diet, percent | Avg. Amt. of Drug Consumed, mg./kg. | No. of Mice | Worm Reduction,[a] percent |
|---|---|---|---|
| 0.25 | 3,210 | 10 | 98 |
| 0.1 | 1,290 | 11 | 81 |
| 0.1 | 1,080 | 10 | 94 |
| 0.05 | 618 | 10 | 71 |

[a] Defined as in Example 5.

EXAMPLE 7

The procedure employed in Example 5 was followed except that the drug was administered by intraperitoneal injection. Table III shows the effect obtained.

Table III.—Efficacy of bis-β-[4-(3-chloro-4-methylphenyl)piperazino]ethyl sulfone against S. mansoni in mice

| Dialy Dose, mg./kg. | No. of Doses | No. of Mice | Worm Reduction,[a] percent |
|---|---|---|---|
| 50 | 4 | 11 | 85 |
| 50 | 10 | 8 | 92 |
| 25 | 10 | 13 | 60 |
| 10 | 10 | 12 | 48 |

[a] Defined as in Example 5.

EXAMPLE 8

A group of African green monkeys, *Cercopithecus aethiops*, were experimentally infected with cercariae of *Schistosoma mansoni* (Puerto Rican strain), 100 cercariae per monkey. After a period of 13 weeks during which the infection was permitted to mature, and after regularly determined fecal egg counts indicated a consistently high output of schistosome eggs, five of the monkeys were treated for ten days by the oral administration of a single capsule daily of bis-β-[4-(3-chloro-4-methylphenyl)piperazino]ethyl sulfone. Two untreated infected monkeys were reserved to serve as controls. The monkeys were maintained for five weeks after treatment and were then necropsied. The remaining worms were recovered from the liver and mesenteries by perfusion. Table IV summarizes the results observed.

Table IV.—Efficacy of bis-β-[4-(3-chloro-4-methylphenyl)piperazino]ethyl sulfone against S. mansoni in green monkeys

| Dosage, mg./kg. | No. of Animals | Avg. Worms per Animal | Worm Reduction,[a] percent |
|---|---|---|---|
| 400 | 4 | 5 | 94 |
| 200 | 3 | 12 | 85 |
| Controls | 2 | 81 | |

[a] Defined as in Example 5.

I claim:
1. A compound selected from the group consisting of compounds of the formula

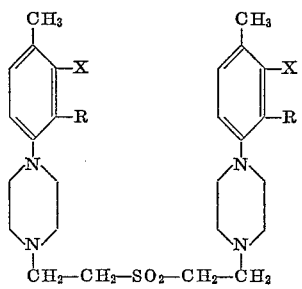

wherein X is halogen and R is selected from the group consisting of hydrogen and methyl, and the acid addition salts thereof with pharmaceutically acceptable acids.

2. A compound of the formula

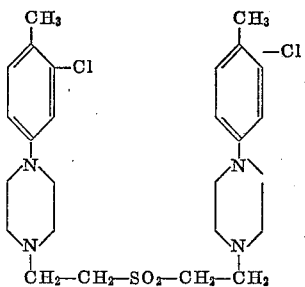

3. A compound of the formula

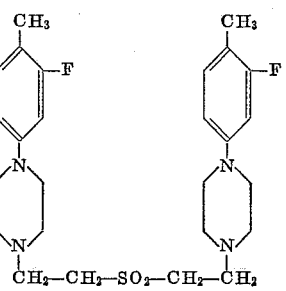

4. A compound of the formula

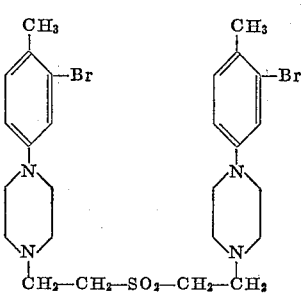

5. A compound of the formula

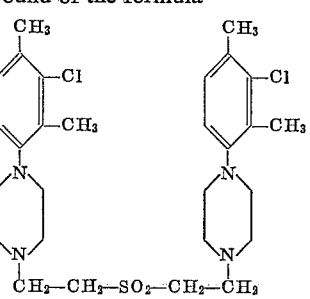

6. The method of treating schistosomiasis which comprises administering to a parasitized host a therapeutically effective amount of a compound selected from the group consisting of compounds of the formula

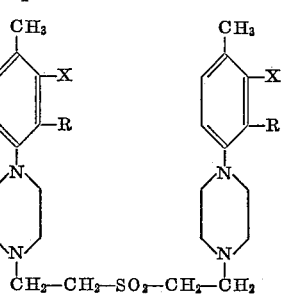

wherein halogen and R is selected from the group consisting of hydrogen and methyl, and the acid addition salts thereof with pharmaceutically acceptable acids.

7. The method of treating schistosomiasis which comprises the oral administration to a parasitized host of between about 10 and about 1000 mg./kg. of host body weight of a compound selected from the group consisting of compounds of the formula

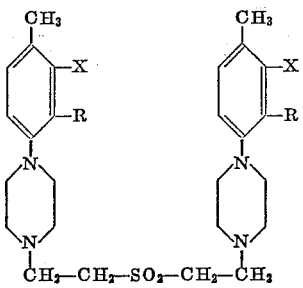

wherein X is halogen and R is selected from the group consisting of hydrogen and methyl, and the acid addition salts thereof with pharmaceutically acceptable acids.

8. The method of treating schistosomiasis which comprises the oral administration to a parasitized host of repeated doses of between about 50 and about 500 mg./kg. of host body weight of a compound selected from the group consisting of compounds of the formula

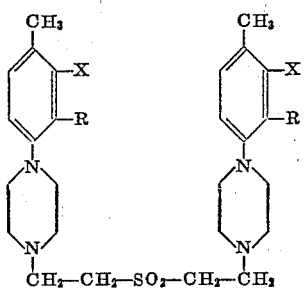

wherein X is halogen and R is selected from the group consisting of hydrogen and methyl, and the acid addition salts thereof with pharmaceutically acceptable acids.

9. The method of treating schistosomiasis which comprises administering to a parasitized host a therapeutically effective amount of a compound of the formula

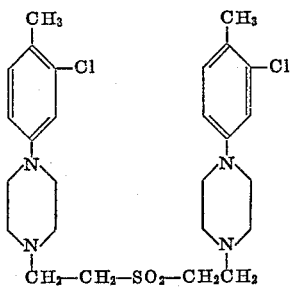

10. The method of treating schistosomiasis which comprises the oral administration to a parasitized host of between about 10 and about 1000 mg./kg. of host body weight of a compound of the formula

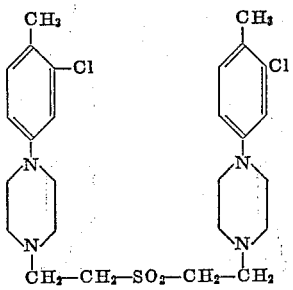

11. The method of treating schistosomiasis which comprises the oral administration to a parasitized host of repeated doses of between about 50 and about 500 mg./kg. of host body weight of a compound of the formula

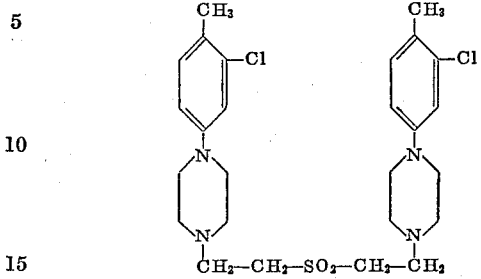

12. The process for preparing a compound selected from the group consisting of compounds of the formula

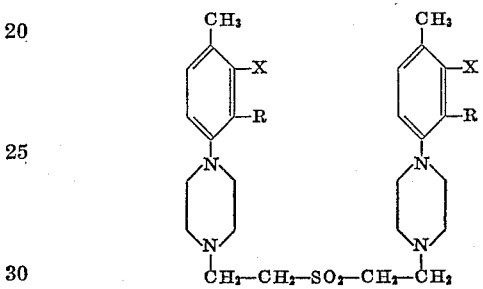

wherein X is halogen and R is selected from the group consisting of hydrogen and methyl which comprises reacting divinyl sulfone with an N-arylpiperazine of the formula

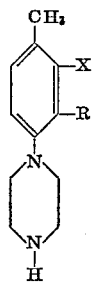

wherein X and R are defined as above.

13. The process for preparing a compound of the formula

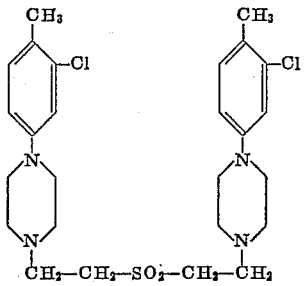

which comprises reacting N-(3-chloro-4-methylphenyl)piperazine with divinyl sulfone.

References Cited by the Examiner

UNITED STATES PATENTS

| | | | |
|---|---|---|---|
| 2,775,538 | 12/56 | Boskamp | 167—55 |
| 2,890,982 | 6/59 | Natt | 167—55 |
| 2,948,727 | 8/60 | D'Amico | 260—268 |
| 2,956,590 | 11/60 | Moss | 260—268 |

(Other references on following page)

FOREIGN PATENTS 661,537  11/51  Great Britain.
818,354  10/61  Germany.

OTHER REFERENCES

Fujii: Chem. Abst., vol. 51, p. 6651(c), 1957.

Sommers et al.: Journal American Chemical Society, vol. 75, pp. 57–60 (1953).

NICHOLAS S. RIZZO, *Primary Examiner.*

JULIAN S. LEVITT, JOHN D. RANDOLPH,
*Examiners.*

UNITED STATES PATENT OFFICE
CERTIFICATE OF CORRECTION

Patent No. 3,203,858                                     August 31, 1965

Walter E. Buting

It is hereby certified that error appears in the above numbered patent requiring correction and that the said Letters Patent should read as corrected below.

Column 2, line 27, for "-[3-chloro-4-methylphenyl)" read -- -[4-(3-chloro-4-methylphenyl)- --; line 34, after "piperazino]" insert a hyphen; same column 2, line 35, for "-[4-3-fluoro-2,4-dimethylphenyl)" read -- -[4-(3-fluoro-2,4-dimethylphenyl)- --; column 4, Table I, fourth column, line 4 thereof, for "62" read -- 52 --; column 5, Table II, second column, line 1 thereof, for "3,210" read -- 3,120 --; column 6, line 73. after "wherein" insert -- X is --; column 7, lines 45 to 55, for that portion of the formula reading same column 7, lines 61 to 73, the upper right-hand portion of the formula should appear as shown below instead of as in the patent:

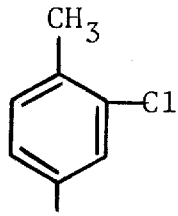

column 8, line 64, after "N-(3-chloro-4-methylphenyl)" insert a hyphen.

Signed and sealed this 29th day of March 1966.

(SEAL)
Attest:

ERNEST W. SWIDER                        EDWARD J. BRENNER
Attesting Officer                        Commissioner of Patents

UNITED STATES PATENT OFFICE
CERTIFICATE OF CORRECTION

Patent No. 3,203,874

August 31, 1965

Robert L. Somerville

It is hereby certified that error appears in the above numbered patent requiring correction and that the said Letters Patent should read as corrected below.

Column 1, line 19, for "liquid" read -- liquor --; column 8, line 27, for "2,727,130" read -- 2,757,130 --.

Signed and sealed this 22nd day of February 1966.

(SEAL)
Attest:

ERNEST W. SWIDER
Attesting Officer

EDWARD J. BRENNER
Commissioner of Patents